United States Patent
Sahouani et al.

(10) Patent No.: US 6,699,533 B2
(45) Date of Patent: Mar. 2, 2004

(54) STABILIZED LIQUID CRYSTAL ALIGNMENT STRUCTURE WITH PRE-TILT ANGLE AND DISPLAY DEVICES CONTAINING THE SAME

(75) Inventors: Hassan Sahouani, Hastings, MN (US); Kim M. Vogel, Lake Elmo, MN (US); Mark S. Schaberg, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 300 days.

(21) Appl. No.: 09/727,662

(22) Filed: Dec. 1, 2000

(65) Prior Publication Data

US 2002/0066885 A1 Jun. 6, 2002

(51) Int. Cl.$^7$ .............................................. C09K 19/00
(52) U.S. Cl. .................................... 428/1.2; 252/299.61
(58) Field of Search ........................ 428/1.1, 1.2, 1.26, 428/1.3, 1.31; 359/58; 252/299.01

(56) References Cited

U.S. PATENT DOCUMENTS

| | | | |
|---|---|---|---|
| 4,031,092 A | 6/1977 | Strebel | |
| 4,165,923 A | 8/1979 | Janning | |
| 4,767,191 A | 8/1988 | Van Sprang et al. | |
| 5,262,882 A | 11/1993 | Hikmet | |
| 5,347,379 A | * 9/1994 | Kawagishi et al. | 359/58 |
| 5,554,419 A | 9/1996 | Chung et al. | |
| 5,568,294 A | 10/1996 | Lee | |
| 5,576,862 A | 11/1996 | Sugiyama et al. | |
| 5,639,398 A | 6/1997 | Rhee et al. | |
| 5,714,087 A | * 2/1998 | Pausch et al. | 252/299.01 |
| 5,948,487 A | * 9/1999 | Sahouani et al. | 428/1 |
| 6,395,354 B1 | * 5/2002 | Sahouani et al. | 428/1.2 |

FOREIGN PATENT DOCUMENTS

| | | | |
|---|---|---|---|
| DE | 285103 A | 12/1990 | |
| JP | 3288131 A | 12/1991 | |
| JP | 5265004 A | 10/1993 | |
| JP | 08165360 A | 6/1996 | |
| JP | 9120069 A | 5/1997 | |
| JP | 10186363 A | 7/1998 | |
| WO | WO94/28073 | 12/1994 | |
| WO | WO96/16015 | 5/1996 | |
| WO | WO99/13021 | 3/1999 | |
| WO | WO00/22463 | 4/2000 | G02B/5/30 |

OTHER PUBLICATIONS

Schneider, T., et al., "Self–Assembled Monolayers and Multilayered Stacks of Lyotropic Chromonic Liquid Crystalline Dyes with In–Plane Orientational Order", *Langmuir*, American Chemical Society, New York, NY, vol. 16, No. 12, (2000) pp. 5227–5230.

U.S. patent application Ser. No. 09/439,190, Sahouani et al., filed Nov. 12, 1999.

U.S. patent application Ser. No. 09/708,752, Sahouani et al., filed Nov. 8, 2000.

Attwood, T.K., and Lydon, J.E., "Lyotropic Mesophase Formation by Anti–Asthmatic Drugs," *Mol. Cryst. Liq. Cryst.*, 1984, 108, 349–357.

Attwood, T.K., and Lydon, J.E., "The Distinction between chromonic and amphiphilic lyotropic mesophases," *Liquid Crystals*, 1990, vol. 7, No. 5, 657–668.

Eunkyoung, Kim et al., "Lyotropic poly(N–anilino–1–alkanesulfonate)s for an alignment memebrane." Mol. Cryst. Liq. Cryst., 1997, Vol 295, pp. 79–84.

Mundy, K., Sleep, J.C., and Lydon, J.E., "The Intercalation of Ethidium Bromide in the Chromonic Lyotropic Phases of Drugs and Nucleic Acids," *Liquid Crystals*, 1995, vol. 19, No. 1, 107–112.

* cited by examiner

*Primary Examiner*—Mark F. Huff
*Assistant Examiner*—Jennifer R. Sadula

(57) ABSTRACT

An alignment structure useful in a liquid crystal display device comprising a substrate having disposed thereon an oriented layer of a chromonic liquid crystalline material, wherein the chromonic liquid crystalline material comprises a chromonic material, a pre-tilt additive, and/or a cross-linking agent. The structure can be made by coating the chromonic liquid crystalline material onto the substrate and then drying or curing the coated substrate. The alignment structure can also include one or more polarizing dyes or other additives and can thus be made to perform polarizing, retarding and/or color filtering functions in addition to alignment and orientation functions. Liquid crystal displays containing such alignment structures and methods of making such displays are also described.

59 Claims, 3 Drawing Sheets

US 6,699,533 B2

STABILIZED LIQUID CRYSTAL ALIGNMENT STRUCTURE WITH PRE-TILT ANGLE AND DISPLAY DEVICES CONTAINING THE SAME

FIELD OF THE INVENTION

In one aspect, the present invention relates to structures, including alignment films and alignment substrates useful in liquid crystal displays. In another aspect, the invention relates to display devices or other optical devices that utilize liquid crystal alignment films or substrates therein.

BACKGROUND OF THE INVENTION

A common liquid crystal display, or "LCD," contains an array of two-dimensional picture elements, or pixels. Although each pixel may, and customarily does, contain numerous optical elements, each comprises a liquid crystal cell. A liquid crystal cell generally comprises a liquid crystal material maintained between a pair of transparent substrates. The transparent substrates are most commonly made of glass or a polymeric material. Interposed between the liquid crystal material and the substrates are electrodes electrically connected to an outside signal device that, when electrically active, alter the state of the liquid crystal material. Such liquid crystal cells find application not only is displays, but also in other optical devices, including optical communication devices and other optical processing equipment.

In a liquid crystal cell, the molecules of the liquid crystal material are aligned, or oriented, in a preferred direction along each of the substrates within the cell. Normally, this alignment is accomplished through the use of an alignment structure layer. Alignment structures generally are glass substrates or polymeric films (e.g. polyimides) that are mechanically rubbed in a single direction to impart an orientating effect on the liquid crystals with which they are in contact. Since the rubbing is generally conducted in a single direction, this leads to a pattern of low to high elevations, or topography, across the surface of the alignment structure. The resulting low to high topography creates a measurable angle between the surface of the alignment substrate and the liquid crystal material that is in contact with the alignment structure. This angle is commonly referred to as the "pre-tilt" angle. The optical activity of the liquid crystal cell is in part a function of the relative orientation of the liquid crystals at the surface of each substrate and the ordered change in direction of the liquid crystals located between the substrates when the cell is electrically active. When the alignment layer has an appreciable pre-tilt angle, the liquid crystals between the substrates will order predominately in a single, controlled direction of orientation when the cell is in an electrically active state. This uniform orientation improves the optical clarity of the cell by reducing the amount of undesirable scattering that would otherwise result if multiple orientations were possible. Additionally, the alignment structures can be chemically resistant to common solvents.

Although alignment structures derived from conventional rubbing techniques can provide pre-tilt control and chemical resistance, these structures suffer many drawbacks associated with the mechanical rubbing. For example, the high temperatures necessary to process many useful polymeric substrates prevent the incorporation of temperature-sensitive adhesives and color dyes into the alignment structure. Variations in the mechanical rubbing process and generation of debris also inhibit uniformity in the alignment structure over large surface areas. Additionally, the conventional rubbing, washing, and drying steps used in manufacture of the alignment structures can be slow, expensive, and introduce gross defects and low yields. There exists, therefore, a need for an alignment structure that can cure the problems associated with mechanical rubbing while maintaining pre-tilt control and/or chemical resistance.

SUMMARY OF THE INVENTION

Briefly, in one aspect, the present invention provides an alignment structure comprising a substrate having disposed thereon an oriented layer of a chromonic liquid crystalline material, wherein the chromonic liquid crystalline material comprises a chromonic material and a pre-tilt additive. This aspect of the invention can also provide an alignment structure comprising a substrate having disposed thereon an oriented layer of a chromonic material, wherein the alignment structure has a pre-tilt angle of between about 5 and 90 degrees. The structures of this aspect of the invention can be made by coating a solution of a chromonic liquid crystalline material onto a substrate and drying the coated substrate. Liquid crystal cells can also be constructed by disposing a liquid crystal material between two parallel display panel substrates and disposing the alignment structure on at least one of the substrates. A plurality of these liquid crystal cells can be used to make a liquid crystal display. Liquid crystal displays can also be made wherein the liquid crystal cells are arranged in a multi-domain pattern.

In another aspect the invention provides an alignment structure comprising a substrate having disposed thereon an oriented layer of a chromonic liquid crystalline material, wherein the chromonic liquid crystalline material comprises a chromonic material and a cross-linking agent. This aspect of the invention can also provide an alignment structure comprising a substrate having disposed thereon an oriented layer of a cross-linked chromonic material. The structures of this aspect of the invention can be made by coating a solution of a chromonic liquid crystalline material onto a substrate and curing the coated substrate. Liquid crystal cells can also be constructed by disposing a liquid crystal material between two parallel display panel substrates and disposing the alignment structure on at least one of the substrates. A plurality of these liquid crystal cells can be used to make a liquid crystal display. Liquid crystal displays can also be made wherein the liquid crystal cells are arranged in a multi-domain pattern.

In yet another aspect the invention provides an alignment structure comprising a substrate having disposed thereon an oriented layer of a chromonic liquid crystalline material, wherein the chromonic liquid crystalline material comprises a chromonic material, a pre-tilt additive, and a cross-linking agent. This aspect of the invention can also provide an alignment structure comprising a substrate having disposed thereon an oriented layer of a cross-linked chromonic material, wherein the alignment structure has a pre-tilt angle of between about 5 and 90 degrees. The structures of this aspect of the invention can be made by coating a solution of a chromonic liquid crystalline material onto a substrate and then curing the coated substrate. Liquid crystal cells can also be constructed by disposing a liquid crystal material between two parallel display panel substrates and disposing the alignment structure on at least one of the substrates. A plurality of these liquid crystal cells can be used to make a liquid crystal display. Liquid crystal displays can also be made wherein the liquid crystal cells are arranged in a multi-domain pattern.

The above summary of the present invention is not intended to describe each illustrated embodiment or every implementation of the present invention. The detailed description and figures which follow more particularly exemplify these embodiments.

DETAILED DESCRIPTION OF PREFERRED EMBODIMENTS

Figure 1:
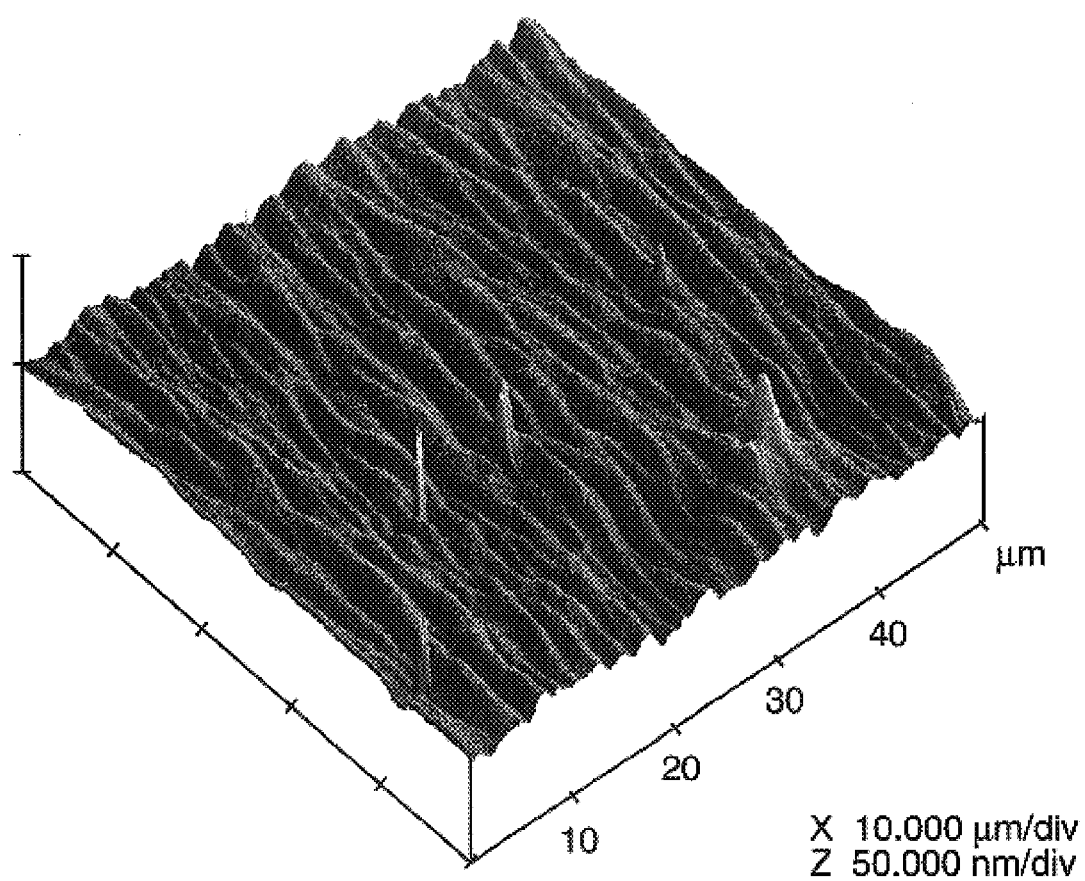
FIG. 1 is an atomic force microscopy scan of the oriented surface of an alignment structure prior to the addition of the pre-tilt and chemical resistance features.

The liquid crystal alignment (or synonymously orientation) structures of the present invention comprise a substrate onto which there is disposed a layer of chromonic liquid crystalline material having an oriented structure. The chromonic liquid crystalline material generally comprises a chromonic material, which is combined with: (1) a pre-tilt additive; (2) a cross-linking agent; or (3) both a pre-tilt additive and a cross-linking agent. Chromonic materials generally comprise large, multi-ringed molecules with a hydrophobic core surrounded by hydrophilic groups that aggregate into an ordered structure in the presence of a solvent. While not wishing to be bound by any particular theory of the invention, it is believed that the hydrophobic component of the pre-tilt additive, when combined in aqueous solution with the chromonic material, provides a pre-tilt angle upon drying. It is further believed that the cross-linking agent tends to interact with the chromonic material in aqueous solution to create a stabilized, chemically resistant structure. The chromonic liquid crystalline material may be easily oriented, for example, by the application of shear force to the material, such as occurs during coating of the materials out of aqueous solution. The orientation of the chromonic liquid crystalline material on the surface of the substrate provides an alignment structure that finds use in liquid crystal displays. These alignment structures can also provide either a pre-tilt angle, or chemical resistance, or both features simultaneously.

Chromonic Materials

Any chromonic liquid crystalline material that forms an oriented structure when applied to a substrate can be employed in this invention, provided that suitable additives and/or cross-linking agents exist to impart the desired pre-tilt and/or chemical resistance features in the alignment structure. Chromonic materials are a type of the more commonly known class of lyotropic materials. See, e.g., Attwood, T. K., and Lydon, J. E., 1984, Molec. Crystals Liq. Crystals, 108, 340 (discussing chromonic materials). Lyotropic materials usually have both hydrophobic and hydrophilic regions that organize in the presence of a solvent. When the lyotropic materials reach critical micelle concentrations (CMC), the lyotropic materials begin to organize. As with other lyotropics, chromonic materials also have both hydrophilic and hydrophobic regions. The chromonics are generally large, multi-ringed molecules with a hydrophobic core which is surrounded by hydrophilic functional groups. When in solution (typically above about 5 percent by weight of the solution), these chromonic molecules tend to aggregate and organize in a nematic ordering characterized by a long range order.

Representative of chromonic compounds are the following:

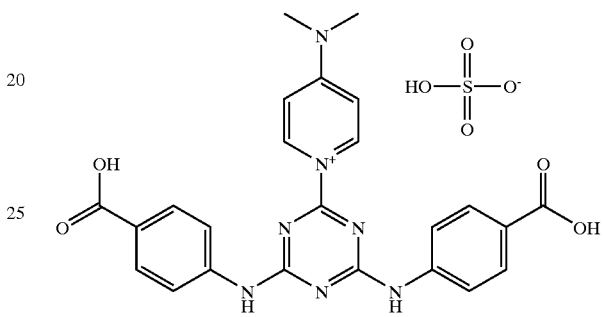

(A)

(4-Dimethylamino-1-[4,6-di(4-carboxyphenylamino)-1,3,5-triazin-2-yl] pyridium sulfate)

and

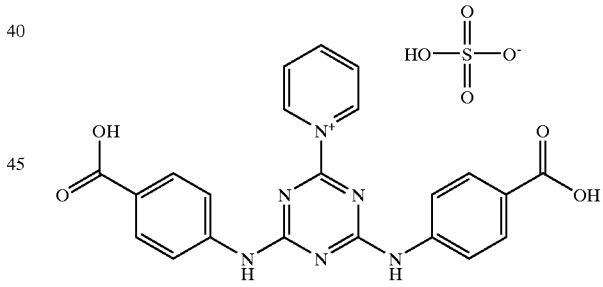

(B)

((4,6-di(4-carboxyphenylamino)-1,3,5-triazin-2-yl) pyridium sulfate)

Useful chromonic materials are also available in zwitterionic form, among them are those of the formulae:

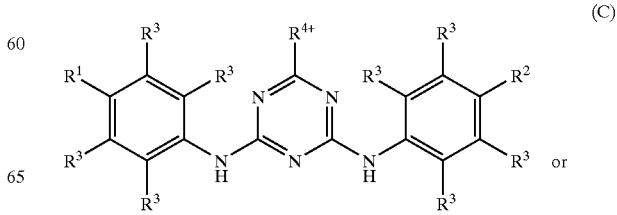

(C)

or

-continued

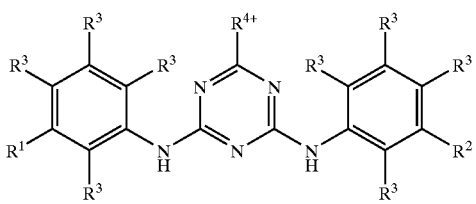

(D)

In reference to both formulae C and D above, $R^1$ is a hydrophilic group, including those generally selected from, but not limited to, carboxylate (COO$^-$), sulfonate (SO$_3^-$), sulfinate (SO$_2^-$), and phosphate (PO$_3$H$^-$) groups. Preferably, $R^1$ is a carboxylate or sulfonate group, most preferably a carboxylate group. The most preferred location for $R^1$ is para with respect to the amino linkage to the triazine backbone of the compound (shown by Formula C).

$R^2$ is a hydrophilic group generally selected from but not limited to carboxylic acid (COOH), sulfonic acid (SO$_3$H), sulfinic acid (SO$_2$H), phosphoric acid (PO$_3$H$_2$), or sulfonamide (SO$_2$NH$_2$) groups. Preferably, $R^2$ is a carboxylic acid group or a sulfonic acid group, most preferably a carboxylic acid group. The most preferred location for $R^2$ is para with respect to the amino linkage to the triazine backbone of the compound (shown by Formula C).

$R^3$, each of which may be the same or different, is selected from any electron donating group, electron withdrawing group or electron neutral group. Preferably, $R^3$ is hydrogen or a substituted or unsubstituted alkyl group, most preferably hydrogen.

$R^4$ is generally selected from substituted and unsubstituted positively charged heteroaromatic rings linked to the triazine backbone through a nitrogen atom within the ring of the $R^4$ group. $R^4$ can be, but is not limited to, heteroaromatic rings derived from pyridine, pyridazine, pyrimidine, pyrazine, imidazole, oxazole, thiazole, oxadiazole, thiadiazole, pyrazole, triazole, triazine, quinoline, and isoquinoline. Preferably, $R^4$ is a pyridine ring. When present, a substituent for the heteroaromatic ring $R^4$ may be selected to determine the properties of the chromonic material, for example, a desired color for the aligned lyotropic liquid crystal material. Such substituents for $R^4$ may be selected from, but are not limited to, any of the following substituted and unsubstituted groups: alkyl, carboxyl, amino, alkoxy, thio, cyano, amide and ester. Preferably, when present, the $R^4$ substituent is a substituted amino or pyrrolidino group, more preferably an alkyl substituted amino group, most preferably a dimethylamio group. Most preferably, the substituent is located at the 4 position on a pyridine ring.

In some cases, the performance of the chromonic liquid crystalline materials can be enhanced with the incorporation of one or more additive compounds. One useful additive is 4-(dimethylamino) pyridine ("DMAP"), which when added to the chromonic liquid crystalline material in amounts between about 1 and 5 percent by weight (more preferably between about 1 and 2 weight percent) improves the optical clarity of the liquid crystalline material. These additives are most beneficial when alignment structures are constructed without cross-linking. Other useful additives include simple sugars, e.g., sucrose, glucose and fructose, which can be added in similar concentrations. Depending on the methods employed to make devices incorporating the alignment structures of the invention, relatively temperature-stable additive materials (e.g., DMAP) may be preferred.

Layers of the these and other chromonic materials dried from solutions applied with a shear force show an oriented surface structure capable of orienting liquid crystals or non-liquid crystal coatings in a planar configuration. In order to obtain an organized structure, the chromonic materials can be placed in aqueous solution in the presence of both a pH-adjusting compound and an auxiliary surfactant. (An auxiliary surfactant is any surfactant that does not fall within the category of defined pre-tilt additives below.) The addition of the pH-adjusting compound allows the chromic material to become soluble in aqueous solution. Suitable pH-adjusting compounds include any known base. Examples of such pH-adjusting compounds include ammonium hydroxide and various amines. The surfactant is also added to the aqueous solution to promote wetting of the solution onto the surface of the substrate. Any auxiliary surfactant, including both ionic and non-ionic surfactants, will be suitable, although a non-ionic surfactant is preferred. One example of a suitable non-ionic auxiliary surfactant is Tritan X-100, which is commercially available from Aldrich Chemical Company.

After the solution is prepared with the pH-adjusting compound and surfactant, it can be applied to a substrate with a shear force to orient the organized structure. However, upon drying, the oriented structure may lack a defined pre-tilt angle and may be susceptible to common solvents, such as water. To increase the pre-tilt angle and chemical resistance of the alignment structure, a pre-tilt additive and cross-linking agent can be used, respectively, in place of (or in addition to) the auxiliary surfactant and pH-adjusting compound as described below.

Pre-Tilt Additives

In order to impart pre-tilt features into the alignment structure, the chromonic materials are combined with a pre-tilt additive in aqueous solution. (The pre-tilt additive will usually be used in place of (and sometimes in addition to) the auxiliary surfactant in the aqueous solution.) The pre-tilt additive generally has both a hydrophilic and hydrophobic region. The hydrophilic region allows the additive to dissolve in aqueous solution and the hydrophobic region is believed to provide the resultant pre-tilt angle. Generally, the hydrophilic region comprises hydrophilic functional groups and the hydrophobic region comprises hydrophobic functional groups with about 4 or more carbons. Preferably, the hydrophobic region will have from about 4 to about 18 carbons, with the exact number of carbons depending on the desired application and pre-tilt angle. Additionally, the hydrophobic region is often in the form of an aliphatic or non-aliphatic carbon chain.

While not dependent upon any particular theory, it is believed that when the pre-tilt additive is placed in aqueous solution with the chromonic material, the hydrophilic region of the additive remains in solution with the chromonic material, while the hydrophobic region tends to orient away from the surface of the chromonic aggregate. As the chromonic liquid crystalline solution is applied with a shear force to the surface of the substrate, the hydrophobic region of the additive tilts away from the planar surface of the chromonic material in a regularly patterned topography. The resulting topography creates a measurable pre-tilt angle between the surface of the alignment substrate and the liquid crystal material that is in contact with the alignment structure. This uniform pre-tilt angle provides controlled orientation of the liquid crystal material when the cell is in an electrically active state and improves the optical clarity of the cell by reducing the amount of undesirable light scattering.

Suitable pre-tilt additives include certain surfactants and other materials containing both hydrophobic and hydrophilic regions. Examples of materials which can be used as pre-tilt additives include alkyl polyglucosides and alkyl polyethylene glycols. The alkyl polyglucoside, for example, comprises a hydrophilic, water-soluble sugar and a hydrophobic region which can be comprised of an aliphatic or non-aliphatic carbon chain of about 4 to about 18 carbons in length. Glucopon 225, which is commercially available from Cognis Corporation, is one example of an alkyl polyglucoside that is suitable as a pre-tilt additive.

The actual value of the pre-tilt angle will vary with the concentration of the additive in solution and the size and chemical nature of its hydrophobic functional groups. As the concentration of the pre-tilt additive increases, the pre-tilt angle in the resultant alignment structure will generally increase. Similarly, as the size, or number of carbons, in the hydrophobic functional group increases, the pre-tilt angle will also typically increase. By varying the concentration of the additive and the type of hydrophobic functional groups, pre-tilt angles between about 5 and 90 degrees can be obtained.

Cross-Linking Agents

In order to impart chemical resistance into the alignment structure, the chromonic materials are combined with a cross-linking agent in aqueous solution. (The cross-linking agent will usually replace (and sometimes be used in addition to) the pH-adjusting compound in the aqueous solution.) A cross-linking agent includes any material that will cross-link with the chromonic material. Although the chemical nature of the cross-linking agent may vary with the specific chromonic material used, suitable cross-linking agents include diamines. For example, when a diamine is combined with the chromonic compounds A and B above, the diamine interacts with the carboxylate functional groups of the chromonic compounds to form a cross-linked structure. Suitable diamines to create the cross-linked structure include the following: ethylenediamine, 2,2-dimethyl-1,3-propanediaamine dihyrdrochloride, 1,3-cyclohexanediamine, 1,3-diaminopentane, isophoronediamine, hexadecane-1,2-diamine, meso-1,2-diphenylethylenediamine, naphthylethylenediamine dihydrochloride, 5-amino-2,2,4-trimethyl-1-cyclopentanemethylamine, 2,2-dimethyl-1,3-propanediamine, 2-phenyl-1,4-butanediamine dihydrochloride, 1,4-diaminocyclohexane, 2-butyl-2-ethyl-1,5-pentanediamine, 1,3-cyclohexanebis(methylamine), 1,5-diamino-2-methylpentane, 1,5-diamino-3-oxapentane, "Jeffamines," or combinations thereof. (Jeffamines are polyoxypropylene and polyoxyethylene diamines and triamines that are available commercially from Huntsman Chemical Company. Both the diamine and triamine forms are suitable as cross-linking agents.)

The degree of cross-linking in the alignment structure will vary depending on the relative concentrations of the chromonic material and cross-linking agent in the aqueous solution. In most instances, the molar ratio of chromonic material to cross-linking agent will range from about 1:1 to about 3:2. For example, with compounds A or B above, when combined with a diamine, a relative molar ratio of at least 1:1 (chromonic material to cross-linking agent) is preferable, with 1 mole of the chromonic material for every 1 mole of the diamine. More preferably, the relative molar ratio will be about 3:2, with 3 moles of chromonic material for every 2 moles of the diamine. This 3:2 molar ratio, for example, correlates to about 10 percent by weight chromic material and about 1 percent by weight cross-linking agent when chromonic compound A or B above is combined with an ethylenediamine in aqueous solution. These relative concentrations, however, will vary depending on the chemical nature of the chromonic material and cross-linking agent, the desired level of chemical resistance, and the desired degree of optical clarity for a given application.

After the chromonic liquid crystalline material is placed in solution with the cross-linking agent at the desired relative concentrations, the solution is typically applied onto a substrate with a shear force to achieve the desired orientation. The substrate is then cured after the aqueous solution is applied. The curing process removes excess water, stabilizes the cross-linked structure, and imparts permanent chemical resistance. After the curing process is complete, the alignment structure is resistant to most known solvents, including water, methyl ethyl ketone, acetone, tetrahydrofuran, toluene, and isopropyl alcohol. The cross-linked alignment structure can generally be sprayed or immersed in the solvent without deleteriously affecting its optical or mechanical properties.

Chromonic Liquid Crystalline Solutions

In order to apply the chromonic materials to the substrate of the alignment structure, aqueous solutions are prepared which are suitable for application by shear force. Generally, the solutions comprise water, the chromonic material, an auxiliary surfactant, and a pH-adjusting compound. If the pre-tilt feature is desired in the final alignment structure, a pre-tilt additive will generally be used, rather than (or in addition to) the auxiliary surfactant. Similarly, if the chemical resistance feature is desired with low pre-tilt, a cross-linking agent will generally be used in place of (or in addition to) the pH-adjusting compound, and an auxiliary surfactant will be used. In most applications, however, both the pre-tilt and chemical resistance features are desirable, such that both the pre-tilt additive and cross-linking agent will be used in place of (or sometimes in addition to) the auxiliary surfactant and pH-adjusting compounds.

The relative concentrations of each of the components in aqueous solution will vary with the desired properties of the alignment structure and the intended application. Generally, the chromonic materials will be added to the solution to achieve a concentration in the range of about 4 to about 20 percent by weight of the solution, though concentrations in the range of about 4 to 8 percent are more often preferred. Solutions outside this concentration range can also be used provided a desired level of functionality, including alignment functionality and processability, is preserved. For example, sufficient concentrations of the chromonic material should provide layers of material of adequate thickness and dryability, without inhibiting the application and orientation process. The concentration of the pre-tilt additive in aqueous solution generally ranges from about 0.01 to about 1 percent by weight of the solution, and the cross-linking agent will be added in molar amounts relative to the concentration of the chromonic material. All of these ranges will vary depending on the relative concentration of chromonic material in the aqueous solution, as well as the desired degree of pre-tilt and/or chemical resistance.

To aid in the application and orientation process, other additives may also be included in the aqueous solution, provided they do not interfere with the desired pre-tilt and/or chemically resistant features of the alignment structure. One example of such an additive is a polymeric binder. Suitable polymeric binders include dextran-type polymers and their sulfates or sulfonated polystyrenes. The binders will usually be added in small amounts ranging from 1 percent by weight to about 5 percent or more. Other additives may also be used depending on the desired application.

Application and Orientation Process

The chromonic liquid crystalline material may be applied to the substrate and easily oriented, for example, by the application of shear force to the material. For sufficient applied shear, the liquid crystalline material assumes an orientation that, upon drying, provides an alignment substrate capable of orienting bulk liquid crystal material in a liquid crystal cell or aligning a non-liquid crystal coating. Coating is one convenient application method because it can simultaneously provide both a means of application and the requisite shear force to obtain the oriented alignment structure. The chromonic liquid crystalline material can be coated by any means that provides for orientation along the plane of the substrate onto which it is applied. Coating techniques that impart shear force include wire-wound rod coating and conventional extrusion dye coating.

Once the chromonic liquid crystalline material is applied and oriented over the surface of the substrate, a drying or curing process is used to remove the excess water from the aqueous solution. If the alignment structure is to provide only the pre-tilt feature, then a simple drying process will be sufficient. In applications where chemical resistance through cross-linking is also desired, the alignment structure will typically be cured following the application and orientation process. Drying of the liquid crystalline layer can be performed using any means suitable for drying layers of aqueous solutions. If a curing process is desired for cross-linked structures, any conventional curing process may be employed. For example, the chromonic liquid crystalline material can be coated on a temperature-resistant substrate and heated to a temperature of about 150° to about 250° C. for about 1 to 4 hours until curing is complete. Generally, the curing process does not require pH-adjustment, but use of a catalyst may enhance curing. Some examples of suitable catalysts belong to the family of metal cation complexes. Useful drying and curing methods will not damage the layer of chromonic liquid crystalline material or significantly disrupt any molecular orientation imparted by shear force during the application and orientation process.

The chromonic liquid crystalline material is disposed on a substrate to form the alignment structure. Substrates onto which the chromonic materials can be applied include any solid materials that will accept the application of the liquid crystalline material and that possess whatever optical characteristics may be required for a given application. For example, transparency, translucency, or reflectivity may be indicated for a given application. Suitable substrate materials include, for example, glass, polyimide, rigid polymeric materials, flexible polymeric films, multilayer films and optical stacks. In addition to a layer of liquid crystalline material, the substrates can also include other layers customarily found in display devices or other components useful in displays. Such additional layers include, for example, polarizers, retarders, color filters, black matrices and electronically-addressable active or passive devices (e.g., transparent electrodes and thin film transistors) and the like. Thus, useful substrates can include one or more optically active layers (such as polarizers, color filters, etc.) and/or one or more additional layers or materials that can be used to affect or control the transmission, reflection, or absorption of light through an overall display construction. Suitable substrate materials can be colored or clear and can be birefringent or non-birefringent.

In representative embodiments, the chromonic liquid crystalline material can be coated or otherwise oriented onto substrates that have patterned electrodes (e.g., transparent conductive oxide stripes such as indium tin oxide and/or that have a matrix of thin film transistors ("TFTs") or other electrically active devices). Such embodiments would include coating or orienting of the chromonic materials directly on top of such electrodes or TFTs, on top of one or more immediate layers such as one or more planarization layer, or on a surface of the substrate opposing the surface having the electrodes or TFTs. Alternatively, the chromonic materials can be oriented onto substrates that are later equipped with electrodes and/or active devices.

Many additional modifications can be made to the alignment structures to broaden the suitable applications beyond the standard liquid crystal displays. In some cases, it may be particularly desirable to incorporate one or more color dyes directly into the alignment structure to provide polarizer and/or color filtration functions. Such incorporation can eliminate the need for additional, separate polarizers or color filter layers in an overall display construction. For example, one or more pleochroic dyes can be incorporated into the ordered matrix of the chromonic material to provide an ordered color polarizer. The incorporated dyes can be selected to provide a variety of useful filtration and polarizing optical effects in a display construction. Many such constructions are provided in co-pending U.S. patent application Ser. No. 09/426,288, the disclosure of which is hereby wholly incorporated by reference.

The chromonic liquid crystalline material of the invention is also compatible with "patterning" techniques. In patterning, an alignment layer is formed on a first substrate and then transferred to a second substrate to form the final alignment structure. The first substrate generally comprises a base layer of polymeric material which is in contact with a "light to heat conversion" layer (LTHC), having disposed thereon an interlayer. The chromonic liquid crystalline material of the invention can be oriented on the interlayer of the first substrate to form an alignment layer. Application of a light source (e.g. a blue or UV light) to the surface of the polymeric material of the first substrate causes the LTHC to heat up and the alignment layer to release from the interlayer. The alignment layer can then be transferred to another substrate to form the final alignment structure in the liquid crystal cell. The ability to use the patterning technology provides flexibility in liquid crystal display production and allows for the construction of multi-domain cells.

Multi-domain cells can be constructed using the alignment structures of the present invention. In making LCD displays, if each cell in the display is oriented in a single direction, the display tends to fade away when viewed from off-angles. To reduce this fading effect, each of the successive cells (either successive cells, groups of cells, or subparts within the cell) in the display can be oriented in a different direction to create multi-domain cells. To achieve the multi-domain orientation, the alignment structure of each successive cell (either successive cells, groups of cells, or subparts within the cell) is constructed with a variable orientation pattern. The alignment structures of the present invention can be used to create this orientation pattern.

To construct the multi-domain cells, for example, the chromonic liquid crystalline material can be oriented according to the processes above over the surface of a first substrate, which is usually an LTHC. After drying, small sections of the chromonic material from the first substrate will be formed into the desired shape (usually with a laser process, such as light induced thermal imaging) and then transferred onto a second substrate. (For further discussion of the light induced thermal imaging process, refer to U.S. Pat. No. 5,693,446 and co-pending U.S. patent application Ser. No. 09/426,288, the disclosures of which are both incorporated herein by reference.) During the transfer, the sections will be rotated and aligned to obtain the desired orientation pattern. The multi-domain cells can be formed using the chromonic liquid crystalline materials containing both the pre-tilt and/or the chemically stabilized features. If the cross-linked structures are to be used, however, the transfer from the first to second layer should preferably be done before the final curing of the alignment structure. Thus, the chromonic liquid crystalline material with the cross-linking agent will be oriented on the first substrate, dried with a conventional drying process to remove excess water, transferred to the second substrate, and then cured once in the final desired orientation pattern.

The accompanying drawings illustrate various embodiments of the alignment structures of the invention. FIG. 1, for example, shows an atomic force microscopy image of the surface of a polymeric substrate (polyethylene terephthalate) shear coated with a layer of chromonic Compound A, which is described above. This figure shows the alignment structure prior to the addition of the pre-tilt and/or chemical resistance features.

Figure 2:
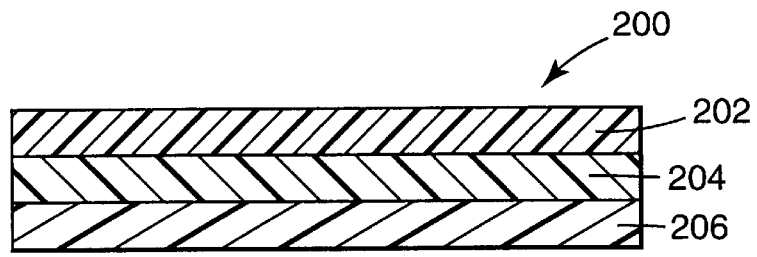
FIG. 2 is a schematic view of a liquid crystal cell according to one aspect of the invention.

FIG. 2, for example, shows the construction of a simple liquid crystal cell 200 according to one embodiment of the invention. The liquid crystal cell 200 includes a top substrate 202 and a bottom substrate 206. On at least one surface of each substrate is an oriented layer of chromonic liquid crystalline material. Between the top and bottom alignment layers is a layer of aligned liquid crystal material 204. The aligned liquid crystal material could include any conventional nematic or smectic liquid crystal material, including twisted nematic liquid crystals, super twisted nematic liquid crystals, ferroelectric liquid crystals, anti-ferroelectric liquid crystals, cholesteric materials, etc. The aligned liquid crystal material can also constitute or include any of the chromonic materials described above, or other lyotropic liquid crystal materials.

The top and bottom substrates are positioned such that the surface containing the oriented layer of chromonic material of each of the substrates is in contact with the liquid crystal material 204 and are positioned to orient the liquid crystal material 204 in a desired manner. Either or both of the top and bottom substrates 202 and 206 can optionally include additional optically active layers. For example, in one embodiment, one or more pleochroic dyes are incorporated into the chromonic liquid crystalline material of the alignment layer in such a manner that, upon application to the alignment substrate, the resulting alignment substrate may then be used as a dichroic polarizer.

Figure 3:
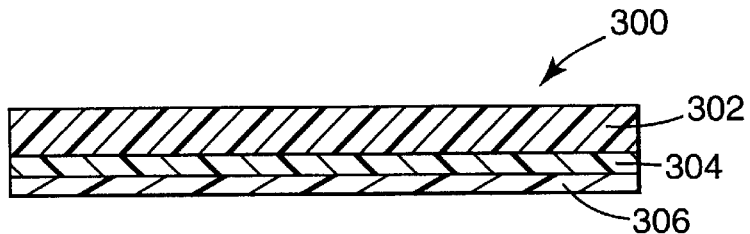
FIG. 3 is a schematic view of an alignment structure that incorporates an ordered layer of chromonic liquid crystalline material according to the invention.

FIG. 3 shows one possible construction of an alignment structure according to the invention. On substrate 300 there is coated a transparent electrode layer 304 such as indium tin oxide. Adjacent to the electrode layer 304 is an oriented layer of chromonic liquid crystalline material 306. In one embodiment the chromonic material includes one or more pleochroic dyes and can thus function simultaneously, depending on the selection and orientation of the dye, as a polarizer, a color filter, and an alignment layer.

Figure 4:
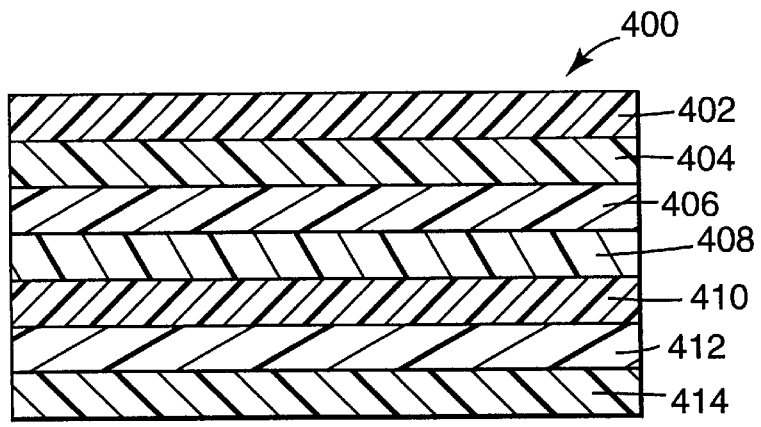
FIG. 4 is a schematic cross-sectional view of a two-polarizer liquid crystal display according to one aspect of the invention.

FIG. 4 provides a cross-sectional view of a possible two-polarizer liquid crystal display device, or LCD. The LCD 400 includes a top polarizer 402, an optional retarder or compensator 404, a liquid crystal cell that includes a top substrate 406, a bottom substrate 410 and a liquid crystal material 408 disposed therebetween. Below the liquid crystal cell is a bottom polarizer 412 and an optional reflective layer or transflector 414. At least one of the top and bottom substrates contains an oriented layer of chromonic liquid crystalline material disposed along the surface that is in contact with the liquid crystal material 408. The reflective or transflector layer 414 can be provided to allow lighting of the liquid crystal display 400 using ambient light or light from a front light guide (not shown). Optionally, a back light (also not shown) can be placed behind the display to allow for back lighting with or without the optional reflective or transflective layer 414.

Figure 5:
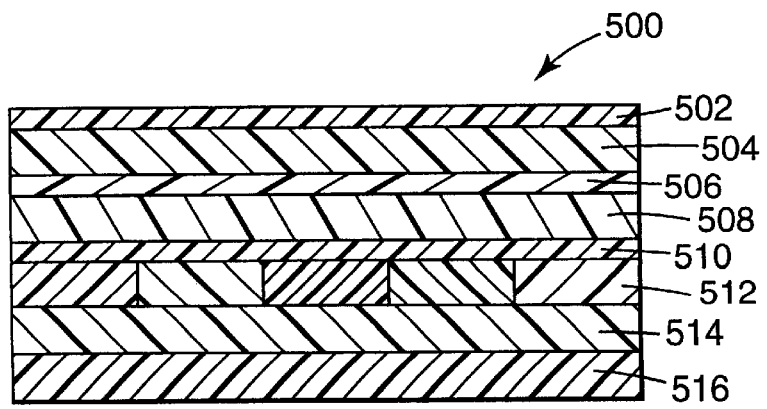
FIG. 5 is a schematic cross-sectional view of a color liquid crystal display according to one aspect of the invention.

FIG. 5 provides a cross-section view of a possible configuration of a color liquid crystal display device that incorporates one or more of the alignment structures of the invention. The color liquid crystal display device 500 includes a top polarizer 502 and a bottom polarizer 516. Between the top and bottom polarizers is a liquid crystal cell that includes a top alignment layer comprising a top substrate material 504 on which is disposed an oriented layer or coating of a chromonic liquid crystalline material 506. A bottom substrate is made of another oriented layer or coating of chromonic liquid crystalline material 510, a color filter array 512 and a bottom substrate material 514. Disposed between the two substrates and in contact with the two adjacent ordered layers or coatings of chromonic material is liquid crystal material 508. Commonly, full color displays employ a regular pattern of primary color filters for color filter array 612. For example, the color filters can be a regular array of three colors, typically red, green and blue, or cyan, magenta and yellow. The color filters can be colored polarizers.

Figure 6:
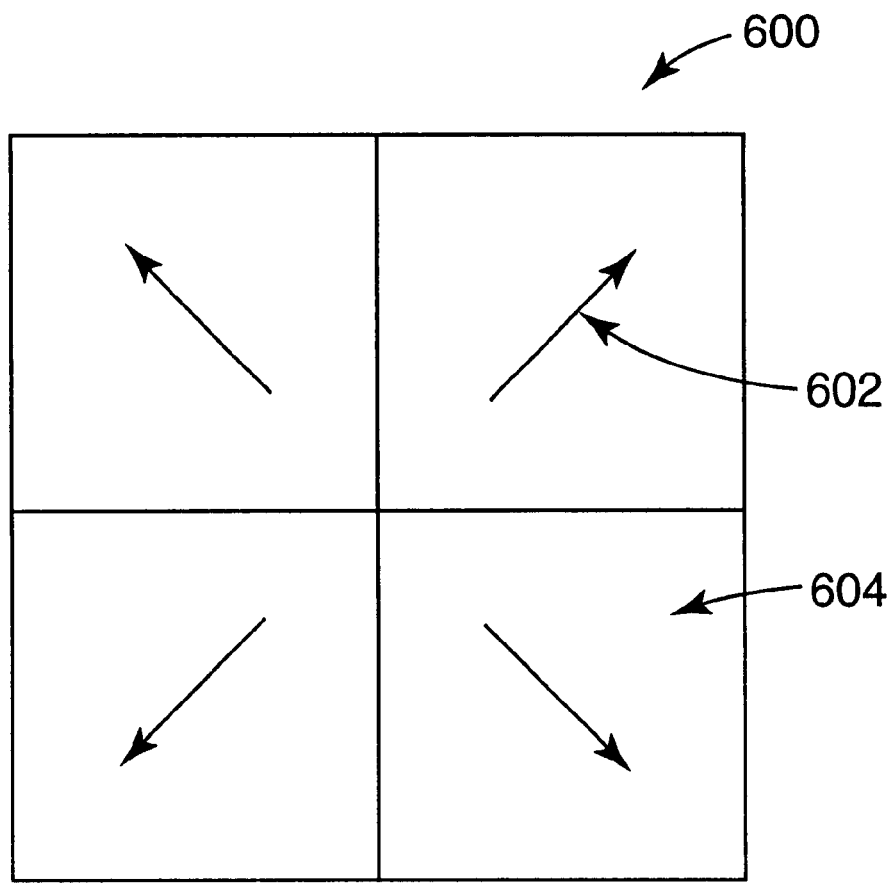
FIG. 6 is a schematic view of a multi-domain pattern which can be constructed using the alignment structures of the invention.

FIGS. 6 provides a schematic view of a multi-domain pattern 600 that can be created using the alignment structures of the invention. The figure shows an example of one orientation pattern that is useful in creating multi-domain displays. The arrows 602 indicate the orientation directions of the alignment structures within the cells and, thus, of the liquid crystal material. To achieve this pattern, the alignment structures should be oriented as shown in four successive cells 604, in a single cell that is subdivided into four subparts 604, or in multiple cells that are divided into four different orientation groups 604. The orientation pattern can be achieved using any of the alignment structures of the invention. The chromonic liquid crystalline material can comprise a chromonic material along with a pre-tilt additive and/or a cross-linking agent.

The following examples are offered to aid in the understanding of the present invention and are not to be construed as limiting the scope thereof. Unless otherwise indicated, all parts and percentages are by weight.

EXAMPLES

Example 1

Method to Make a Chromonic Material in Zwitterion Form

A chromonic material in zwitterionic form, 4-({4-[(4-carboxylphenyl)amino]-6-[4-(dimethylamino) pyridinium-1-yl]-1,3,5-triazin-2-yl}amino)benzoate, was prepared in the following manner according to the following reaction.

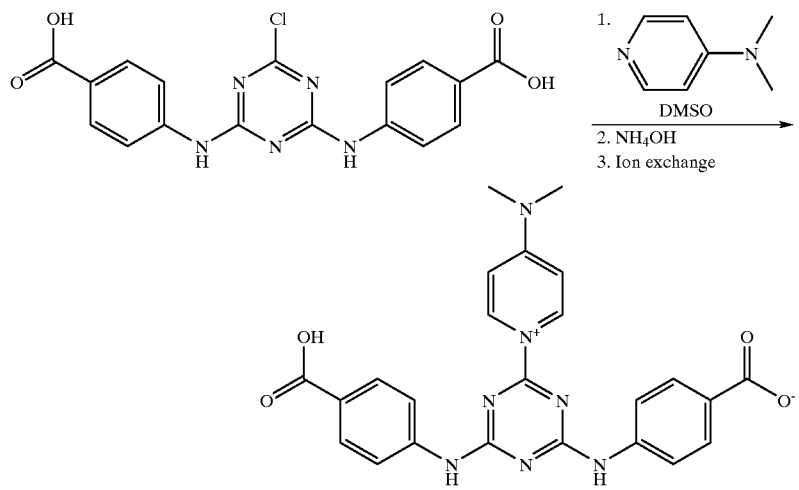

To a 500 mL three necked round bottom flask with a thermometer, overhead stirrer, and condenser was added 50 grams of 4,4-[(6-chloro-1,3,5-triazine,2,4-diyl) diimino]bisbenzoic acid, 15.83 grams of 4-dimethylaminopyridine, and 270 mLs of dimethylsulfoxide. The mixture was heated to 90° C. for a total of three hours. The mixture was cooled to room temperature and the resulting solid was collected by filtration, washed with dimethylsulfoxide and acetone and air dried to give 41.10 grams of 1-{4,6-bis[4-carboxyphenyl)amino]-1,3,5-triazin-2-yl}-4-(dimethylamino)pyridinium chloride. Fourteen grams of this solid was added to a one liter three necked round bottom flask with an overhead stirrer and to this was added 307 mLs of distilled water and 5.53 grams of 28 wt % aqueous ammonium hydroxide solution. The mixture was stirred until the solid dissolved. The solution was passed down a 600 mm by 58 mm column containing 300 g of Mitsubishi SAT-10 ion exchange resin (the resin was prewashed with a 0.5 wt % aqueous ammonium hydroxide solution). The eluent was stripped in vacuum at 15 mm Hg and 80° C. to give 12.66 g of 4-({4-[(4-carboxylphenyl)amino]-6-[4-(dimethylamino)pyridinium-1-yl]-1,3,5-triazin-2-yl}amino) benzoate.

Example 2
Alignment Structure with Pre-Tilt Angle

An aqueous solution was prepared in deionized water with about 8 percent chromonic compound A, 1 percent Glucopon 225 (pre-tilt additive) from Cognis Corporation, and 1 percent ammonium hydroxide. The above components were mixed for 30 minutes and filtered in a 5-micron syringe filter. A thin layer of the filtered chromonic solution was coated onto one side of each of two glass slides using a simple knife coater. The two glass slides were previously coated with a transparent conductive layer of indium tin oxide (700 Å). The slides were air dried, and glass beads 5 microns in diameter were sprayed from an ethanol solution on the side of each slide coated with the chromonic layer. The slides were adhered together in such a manner that the coating directions of the chromonic layers were at 90 degrees to one another and such that the two cells together formed a simple cell construction. A small opening was left between the slides, and the cell was vacuum filled with nematic liquid crystal material MLC 6650, available from Merck Inc.

The filled cell was viewed between two crossed polarizers. The filled cell transmitted substantially all light between the polarizers, indicating the achievement of a uniformly-aligned 90 degree twist of the nematic liquid crystal material within the cell. When a signal of 5 volts was applied to the cell, a uniform black background was observed under the microscope. Because there were no observable defects, which generally appear under the microscope as white light due to disclinations, this indicated high pre-tilt uniformity. High pre-tilt angles in the range of about 5 to 90 degrees can be obtained by varying the concentration of the Glucopon 225 pre-tilt additive in the aqueous solution.

Example 3
Alignment Structure with Cross-Linking

An aqueous solution was prepared in deionized water with about 8 percent chromonic compound A, 0.01 percent Triton X-100 (auxiliary surfactant) from Aldrich Chemical Company, and 1 percent ethylenediamine. The above components were mixed for 30 minutes and filtered in a 5 micron syringe filter. A thin layer of the filtered chromonic solution was coated onto one side of each of two glass slides using a simple knife coater. The two glass slides were previously coated with a transparent conductive layer of indium tin oxide (700 Å). The slides were heated on a hot plate for 1 hour at 250 degrees Celsius. Dipping of the cured slides in common solvents such as water, methyl ethyl ketone, tetrahydrofuran, acetone, and isopropyl alcohol did not dissolve the alignment layers. Glass beads 5 microns in diameter were sprayed from an ethanol solution on the side of each slide coated with the chromonic layer. The slides were adhered together in such a manner that the coating directions of the chromonic layers were at 90 degrees to one another and such that the two cells together formed a simple cell construction. A small opening was left between the slides, and the cell was vacuum filled with nematic liquid crystal material MLC 6650, available from Merck Inc.

Example 4
Alignment Structure with Pre-Tilt Angle and Cross-Linking

An aqueous solution was prepared in deionized water with about 8 percent chromonic compound A, 1 percent Glucopon 225 (pre-tilt additive) from Cognis Corporation, and 1 percent ethylenediamine. The above components were mixed for 30 minutes and filtered in a 5 micron syringe filter. A thin layer of the filtered chromonic solution was coated onto one side of each of two glass slides using a simple knife coater. The two glass slides were previously coated with a transparent conductive layer of indium tin oxide (700 Å). The slides were heated on a hot plate for 1 hour at 250 degrees Celsius. Dipping of the cured slides in common solvents such as water, methyl ethyl ketone, tetrahydrofuran, acetone, and isopropyl alcohol did not dissolve the alignment layers. Glass beads 5 microns in diameter were sprayed from an ethanol solution on the side of each slide coated with the chromonic layer. The slides were adhered together in such a manner that the coating directions of the chromonic layers were at 90 degrees to one another and such that the two cells together formed a simple cell construction. A small opening was left between the slides, and the cell was vacuum filled with nematic liquid crystal material MLC 6650, available from Merck Inc.

The filled cell was viewed between two crossed polarizers. The filled cell transmitted substantially all light between the polarizers, indicating the achievement of a uniformly-aligned 90 degree twist of the nematic liquid crystal material within the cell. When a signal of 5 volts was applied to the cell, a uniform black background was observed under the microscope. Because there were no observable defects, which generally appear under the microscope as white light due to disclinations, this indicated high pre-tilt uniformity. High pre-tilt angles in the range of about 5 to 90 degrees can be obtained by varying the concentration of the Glucopon 225 pre-tilt additive in the aqueous solution.

The present invention should not be considered limited to the particular examples described above, but rather should be understood to cover all aspects of the invention fairly set out in the attached claims. Various modifications, equivalent processes, as well as numerous structures to which the present invention may be applicable will be readily apparent to those of skill in the art without departing from the scope and spirit of this invention. The claims are intended to cover such modifications and devices.

What is claimed is:

1. An alignment structure for liquid crystal material comprising:

(a) a substrate having disposed thereon an oriented layer of a chromonic liquid crystalline material, wherein the chromonic liquid crystalline material comprises a chromonic material and a pre-tilt additive; and (b) liquid crystal material;
   wherein the oriented layer of chromonic liquid crystalline material is in contact with the liquid crystal material.

2. The alignment structure of claim 1, wherein the chromonic material is selected from a group consisting of (4-Dimethylamino-1-[4,6-di(4-carboxyphenylamino)-1,3,5-triazin-2-yl] pyridium sulfate), ((4,6-di(4-carboxyphenylamino)-1,3,5-triazin-2-yl) pyridium sulfate), or combinations thereof.

3. The alignment structure of claim 1, wherein the chromonic material is selected from a group consisting of:

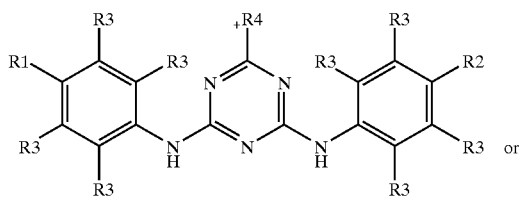 or

-continued

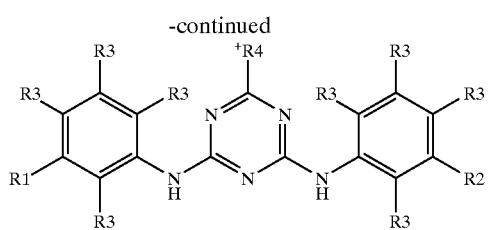

or combinations thereof, wherein $R^1$ is selected from the group consisting of $COO^-$, $SO_3^-$, $SO_2^-$, and $PO_3H^-$, wherein $R^2$ selected from a group consisting of $COOH$, $SO_3H$, $SO_2H$, $PO_3H_2$, or $SO_2NH_2$, wherein $R^3$ is selected from any electron donating group, electron withdrawing group, or electron neutral group, and wherein $R^4$ is selected from a group of heteroaromatic rings derived from pyridine, pyridazine, pyrimidine, pyrazine, imidazole, oxazole, thiazole, oxadiazole, thiadiazole, pyrazole, triazole, triazine, quinoline, and isoquinoline.

4. The alignment structure of claim 1, wherein the pre-tilt additive has both a hydrophilic and hydrophobic region, and wherein the hydrophobic region comprises one or more hydrophobic functional groups with about 4 or more carbons.

5. The alignment structure of claim 1, wherein the pre-tilt additive has both a hydrophilic and hydrophobic region, and wherein the hydrophobic region comprises one or more hydrophobic functional groups with about 4 carbons to about 18 carbons.

6. The alignment structure of claim 5, wherein the carbons in the hydrophobic region of the pre-tilt additive are arranged in an aliphatic or non-aliphatic carbon chain.

7. The alignment structure of claim 1, wherein the pre-tilt additive is an alkyl polyglucoside or an alkyl polyethylene glycol.

8. The alignment structure of claim 1, wherein the pre-tilt angle of the alignment structure is between about 5 and 90 degrees.

9. The alignment structure of claim 1 further comprising one or more additives.

10. The alignment structure of claim 9, wherein the additive is 4-(dimethylamino) pyridine.

11. The alignment structure of claim 9, wherein the additive is a simple sugar.

12. The alignment structure of claim 1, wherein the alignment structure further comprises one or more pleochroic dyes.

13. The alignment structure of claim 1, wherein the alignment structure further comprises a transparent electrode layer which is adjacent and optically connected to the oriented layer of chromonic liquid crystalline material.

14. The alignment structure of claim 1, wherein the alignment structure further comprises at least one color filter element or array.

15. The alignment structure of claim 1, wherein the alignment structure further comprises at least one additional layer in contact with the oriented layer of chromonic liquid crystalline material.

16. The alignment structure of claim 15, wherein the additional layer comprises a cholesteric material.

17. The alignment structure of claim 15, wherein the additional layer comprises a polymer film.

18. The alignment structure of claim 1, wherein the substrate is a glass substrate.

19. The alignment structure of claim 1, wherein the substrate comprises a transparent polymeric material.

20. The alignment structure of claim 19, wherein the transparent polymeric substrate is polyimide.

21. The alignment structure of claim 1, wherein the substrate comprises a reflective material.

22. A liquid crystal cell comprising a liquid crystal material disposed between two parallel display panel substrates, at least one of the substrates having disposed thereon an oriented layer of a chromonic liquid crystalline material, wherein the chromonic liquid crystalline material comprises a chromonic material and a pre-tilt additive, and further wherein the oriented layer of chromonic liquid crystalline material is in contact with the liquid crystal material.

23. A liquid crystal display comprising a plurality of liquid crystal cells according to claim 22.

24. The liquid crystal display of claim 23, wherein the liquid crystal cells are arranged in a multi-domain pattern.

25. An optical device comprising one or more of the liquid crystal cells of claim 22.

26. The optical device of claim 25, wherein the device is an optical communication device.

27. An alignment structure for liquid crystal material comprising:
(a) a substrate having disposed thereon an oriented layer of a chromonic liquid crystalline material, wherein the chromonic liquid crystalline material comprises a chromonic material and a cross-linking agent; and
(b) liquid crystal material;
wherein the oriented layer of chromonic liquid crystalline material is in contact with the liquid crystal material.

28. The alignment structure of claim 27, wherein the chromonic material is selected from a group consisting of (4-Dimethylamino-1-[4,6-di(4-carboxyphenylamino)-1,3,5-triazin-2-yl] pyridium sulfate), ((4,6-di(4-carboxyphenylamino)-1,3,5-triazin-2-yl) pyridium sulfate), or combinations thereof.

29. The alignment structure of claim 27, wherein the chromonic material is selected from a group consisting of:

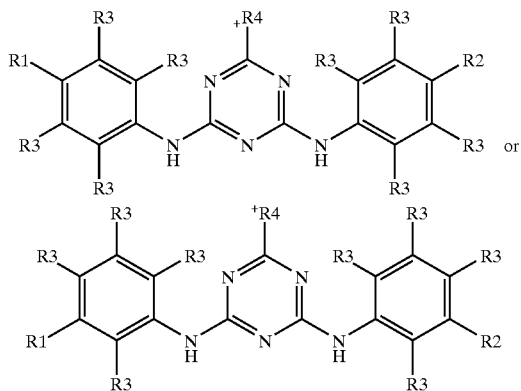

or combinations thereof, wherein $R^1$ is selected from the group consisting of $COO^-$, $SO_3^-$, $SO_2^-$, and $PO_3H^-$, wherein $R^2$ is selected from a group consisting of COOH, $SO_3H$, $SO_2H$, $PO_3H_2$, or $SO_2NH_2$, wherein $R^3$ is selected from any electron donating group, electron withdrawing group, or electron neutral group, and wherein $R^4$ is selected from a group of heteroaromatic rings derived from pyridine, pyridazine, pyrimidine, pyrazine, imidazole, oxazole, thiazole, oxadiazole, thiadiazole, pyrazole, triazole, triazine, quinoline, and isoquinoline.

30. The alignment structure of claim 27, wherein the cross-linking agent is a diamine.

31. The alignment structure of claim 27, wherein the cross-linking agent is selected from the group consisting of ethylenediamine, 2,2-dimethyl-1,3-propanediamine dihyrdrochloride, 1,3-cyclohexanediamine, 1,3-diaminopentane, isophoronediamine, hexadecane-1,2-diamine, meso-1,2-diphenylethylenediamine, naphthylethylenediamine dihydrochloride, 5-amino-2,2,4-trimethyl-1-cyclopentanemethylamine, 2,2-dimethyl-1,3-propanediamine, 2-phenyl-1,4-butanediamine dihydrochloride, 1,4-diaminocyclohexane, 2-butyl-2-ethyl-1,5-pentanediamine, 1,3-cyclohexanebis(methylamine), 1,5-diamino-2-methylpentane, 1,5-diamino-3-oxapentane, Jeffamines, or combinations thereof.

32. The alignment structure of claim 27, wherein the cross-linking agent is ethylenediamine.

33. The alignment structure of claim 27, wherein the relative molar ratio of the chromonic material to the cross-linking agent is between about 1:1 and about 3:2.

34. The alignment structure of claim 27, wherein the alignment structure further comprises one or more pleochroic dyes.

35. The alignment structure of claim 27, wherein the alignment structure further comprises a transparent electrode layer which is adjacent and optically connected to the oriented layer of chromonic liquid crystalline material.

36. The alignment structure of claim 27, wherein the alignment structure further comprises at least one color filter element or array.

37. The alignment structure of claim 27, wherein the alignment structure further comprises at least one additional layer in contact with the oriented layer of chromonic liquid crystalline material.

38. The alignment structure of claim 37, wherein the additional layer comprises a cholesteric material.

39. The alignment structure of claim 37, wherein the additional layer comprises a polymer film.

40. The alignment structure of claim 27, wherein the substrate is a glass substrate.

41. The alignment structure of claim 27, wherein the substrate comprises a transparent polymeric material.

42. The alignment structure of claim 41, wherein the transparent polymeric substrate is polyimide.

43. A liquid crystal cell comprising a liquid crystal material disposed between two parallel display panel substrates, at least one of the substrates having disposed thereon an oriented layer of a chromonic liquid crystalline material comprising a chromonic material and cross-linking agent, and further wherein the oriented layer of chromonic liquid crystalline material is in contact with the liquid crystal material.

44. A liquid crystal display comprising a plurality of liquid crystal cells according to claim 43.

45. The liquid crystal display of claim 44, wherein the liquid crystal cells are arranged in a multi-domain pattern.

46. An optical device comprising one or more of the liquid crystal cells of claim 43.

47. The optical device of claim 46, wherein the device is an optical communication device.

48. An alignment structure for liquid crystal material comprising:
(a) a substrate having disposed thereon an oriented layer of a chromonic liquid crystalline material, wherein the chromonic liquid crystalline material comprises a chromonic material, a pre-tilt additive, and a cross-linking agent; and
(b) liquid crystal material;
wherein the oriented layer of chromonic liquid crystalline material is in contact with the liquid crystal material.

49. A liquid crystal cell comprising a liquid crystal material disposed between two parallel display panel substrates, at least one of the substrates having disposed thereon an oriented layer of a chromonic liquid crystalline material, wherein the chromonic liquid crystalline material comprises a chromonic material, a pre-tilt additive, and a cross-linking agent, and further wherein the oriented layer of chromonic liquid crystalline material is in contact with the liquid crystal material.

50. A liquid crystal display comprising a plurality of liquid crystal cells according to claim 49.

51. The liquid crystal display of claim 50, wherein the liquid crystal cells are arranged in a multi-domain pattern.

52. An optical device comprising one or more of the liquid crystal cells of claim 49.

53. The optical device of claim 52, wherein the device is an optical communication device.

54. A method of making an alignment structure for liquid crystal material comprising:
  (a) coating a solution of a chromonic liquid crystalline material onto a substrate and then drying the coated substrate, wherein the chromonic liquid crystalline material comprises a chromonic material and a pre-tilt additive;
  (b) providing liquid crystal material; and
  (c) placing the chromonic liquid crystalline material in contact with the liquid crystal material.

55. A method of making an alignment structure for liquid crystal material comprising:
  (a) coating a solution of a chromonic liquid crystalline material onto a substrate and then curing the coated substrate, wherein the chromonic liquid crystalline material comprises a chromonic material and a cross-linking agent;
  (b) providing liquid crystal material; and
  (c) placing the chromonic liquid crystalline material in contact with the liquid crystal material.

56. A method of making an alignment structure for liquid crystal material comprising:
  (a) coating a solution of a chromonic liquid crystalline material onto a substrate and then curing the coated substrate, wherein the chromonic liquid crystalline material comprises a chromonic material, a pre-tilt additive, and a cross-linking agent;
  (b) providing liquid crystal material; and
  (c) placing the chromonic liquid crystalline material in contact with the liquid crystal material.

57. An alignment structure for liquid crystal material comprising a substrate having disposed thereon an oriented layer of a chromonic material, wherein the alignment structure has a pre-tilt angle of between about 5 and 90 degrees, and further wherein the oriented layer of chromonic material is in contact with liquid crystal material.

58. An alignment structure comprising a substrate having disposed thereon an oriented layer of a cross-linked chromonic material.

59. An alignment structure comprising a substrate having disposed thereon an oriented layer of a cross-linked chromonic material, wherein the alignment structure has a pre-tilt angle of between about 5 and 90 degrees.

* * * * *